Aug. 28, 1923.

F. M. WHITE

CIGAR MACHINE

Filed March 16, 1920   2 Sheets-Sheet 1

1,466,323

Aug. 28, 1923.

F. M. WHITE 1,466,323

CIGAR MACHINE

Filed March 16, 1920

Inventor
F. M. White
by Meyers & Cavanagh
attys

Patented Aug. 28, 1923.

1,466,323

UNITED STATES PATENT OFFICE.

FRANK MORGAN WHITE, OF HUNTINGTON, WEST VIRGINIA, ASSIGNOR, BY DIRECT AND MESNE ASSIGNMENTS, TO P. LORILLARD COMPANY, A CORPORATION OF NEW JERSEY.

CIGAR MACHINE.

Application filed March 16, 1920. Serial No. 366,299.

*To all whom it may concern:*

Be it known that I, FRANK MORGAN WHITE, a citizen of the United States, residing at Huntington, in the county of Ca-bell and State of West Virginia, have invented certain new and useful Improvements in Cigar Machines, of which the following is a specification, reference being had therein to the accompanying drawing.
My invention has for its object the remedying or elimination of certain objections which characterize the machines for making cigarettes or little cigars of the type having a feed belt upon which the filler is deposited. On damp days the belt stretches and on hot dry days it shrinks, causing light weight cigars in the former case and heavy weight in the latter. When the belt stretches longitudinally it contracts transversely so that tobacco can wedge between it and the sides of the hopper through which it travels and thus the cigars have soft ends. In time the belt becomes so stretched from use that it must be discarded, and this is expensive.
Associated with this belt is a transfer or shuttle mechanism by which the filler is transferred to the roller apron for rolling and delivery to the wrapper. By my invention I eliminate the belt and the transfer devices both of which involve more or less complicated mechanisms that are costly to make and subject to wear and derangement, and certain of which are a source of danger to the operatives.
In the annexed drawings, Fig. 1 is a side elevation of a little cigar machine embodying my invention;

Fig. 3 is a detail view of a different construction of short filler feed;

Fig. 4 is a detail view of the funnel bottom moving device.

Figure 1:
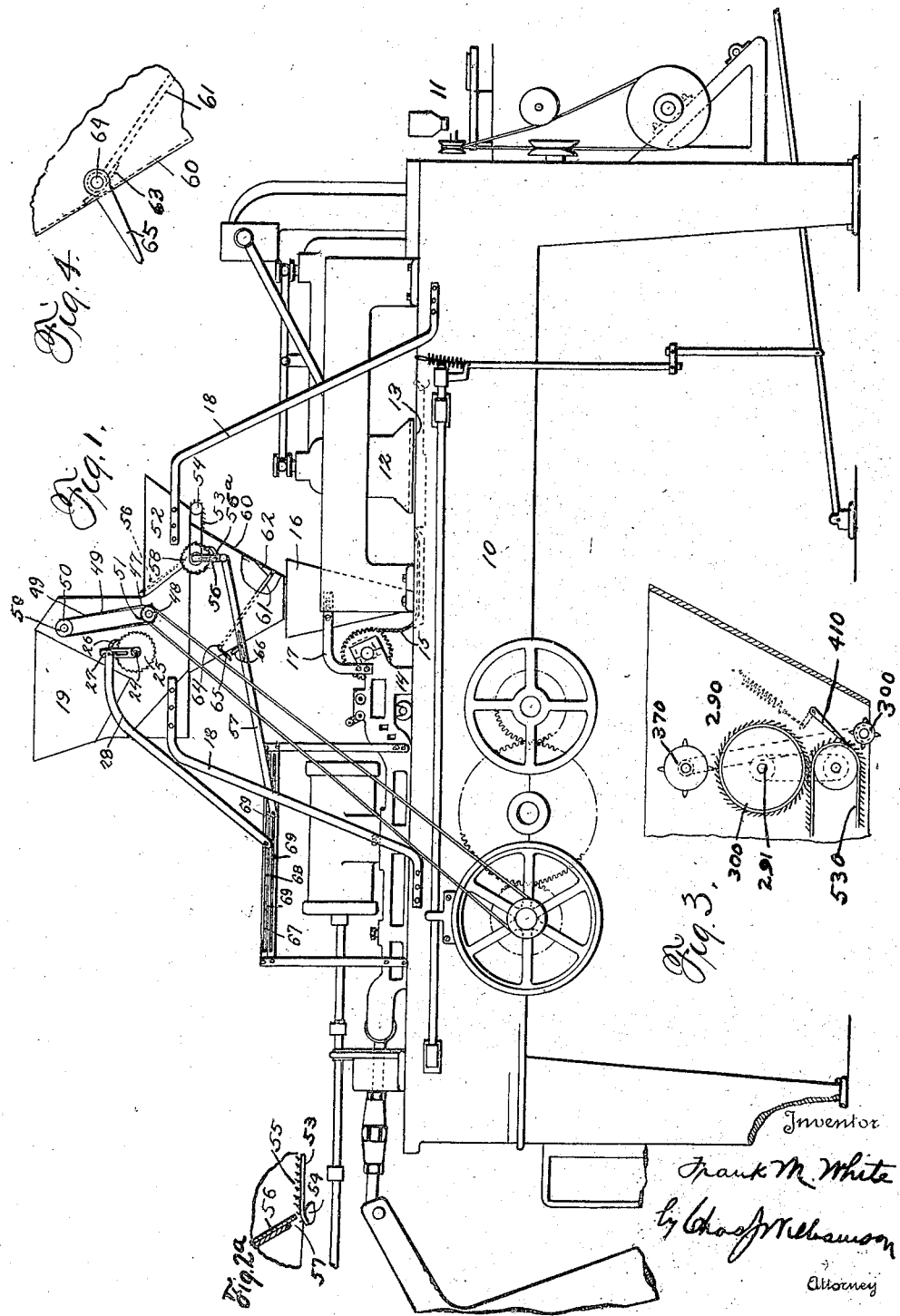

Briefly described, my invention comprehends the use of an automatically operated source of supply of filler that delivers directly to the roller apron of the cigar machine, a measured quantity of filler. The form and arrangement of parts forming the mechanism may be varied, and it will therefore be understood that the particular construction and arrangement shown in the drawings and which I am about to describe in detail, is to be taken as merely illustrative, and not restrictive of my invention.

In the drawings, 10 designates the frame of a well-known little cigar machine that comprises a wrapper cutting mechanism 11, a traveling nozzle 12 that travels between the die of the cutting mechanism and the vacuum plate 13, a carriage or slide 14, and a rubber cigar rolling apron 15 which by the travel of the slide in one direction is caused to roll filler placed thereon and to deliver the same to the wrapper placed on the vacuum plate by the nozzle. As the parts thus far described, and their actuating mechanism are of well known construction, no further description of them is required.

Rigidly attached to and thus partaking of the reciprocations of the carriage or slide is a funnel or hopper 16 whose lower discharge end is close to the apron 15. An arm 17 on each side attaches the hopper to the slide.

Stationarily supported by the frame 10, as by arms 18 fastened thereto at their lower ends, is a hopper for long filler tobacco and one for short filler tobacco from which periodically the desired quantity of tobacco for one cigar is dropped into the funnel 16.

The periodical discharge of tobacco from said hoppers is automatically effected, as hereinafter described, by motions derived from the carriage 14.

The long filler hopper 19 has a downwardly inclined bottom formed by an endless belt or apron 20 of canvas, that passes over a pair of rollers 21, on the end of one of which is a sprocket wheel 22 that is connected by a chain with a driving sprocket wheel 23 on a shaft 24. On the latter is a ratchet wheel 25 engaged by a feed dog 26 carried by a lever 27 pivoted to swing on the shaft 24 and connected by a link 28 with the carriage 14, as hereafter explained. Within the hopper, and connected with the shaft 24 so as to rotate therewith, is a roller or drum 29 which reaches from side to side of the hopper and is close to the belt 20 at the lowest point of the latter. On the periphery of the drum 29 are numerous teeth 30 which may consist of double pointed tacks inserted through a leather band 31 which is fitted about the drum circumference, and the points of such teeth just clear the belt 20, as the drum revolves, their function being to take up the tobacco delivered to the drum circumference. Above the toothed drum 29 is a similar revolving toothed drum 32 whose teeth 33 are preferably finer and smaller and which travel sufficiently close to the teeth of the drum 29 to take or comb off any excess tobacco on the drum 29 and permit only that caught by the teeth 30 thereof to remain on the drum 29. The two drums are geared to rotate together, by a sprocket chain 34 that connects a sprocket wheel 35 on the drum shaft with a sprocket wheel 36 on the shaft of drum 32. Above, and close to the drum 32 is a brush roll 37, preferably of wood, with peripheral blades 38 of leather or other flexible material that serve to fan or brush back into the hopper, tobacco carried by the teeth of the drum 32.

Lying close to the drum 29 is a picker roll 39, with rows of teeth 40 on its periphery, which pick or strip from the adjacent drum teeth 30, the tobacco adhering to the latter and drop it, and to assure a measured and exact quantity of tobacco being taken and delivered, I place a slotted plate or comb 41 against the periphery of the drum 29, with its fingers lying between the circular rows of teeth 30 on such drum. The comb 41 extends at an incline upward and away from the drum, and is caused yieldingly to press against the latter by placing it on a pivot 42 and attaching to a crank arm 43 one end of a coil spring 44 whose other end is attached to a bracket 46 on the side wall of the hopper 19. The comb serves to hold back the tobacco so that only a measured amount reaches the teeth of the picker roll. The picker roll is revolved at a high speed, preferably 600 R. P. M. in the machine shown, and it is belted to the driving pulley 47 on its shaft 48. The brush roll is belted to the picker roll shaft by a belt 49 that connects a pulley 50 on its shaft with a pulley 51 on the picker roll shaft.

The hopper 52 for short filler is placed adjacent the long filler hopper. At its bottom it has a horizontal endless band or apron 53 that runs over a pair of rollers 54, one at each end of the hopper. Said band is similar to the clothing or covering of the upper drum 32, with its teeth inclined rearward of the direction of travel through the hopper so as to prevent the tobacco clinging to the teeth. At its forward or discharge end the hopper has a slide 56 that is adjustable to vary the size of the outlet opening, so as to regulate the quantity of filler removed from the hopper.

The band 53 has a step by step motion in unison with the like motion of the drum 29 of the long filler feed mechanism, and this is accomplished by a ratchet wheel 58 on the shaft of one of the rollers 54, engaged by a feed dog 55, on a lever 56ª connected by a link 57 with the carriage 14, as hereafter explained. The two rollers 54 are geared together by a sprocket chain 58ª that runs over wheels 59 on the respective roller shafts.

The discharge from both long and short filler hoppers falls into a common spout from which the tobacco is delivered to the funnel. In said spout, 60, is a downwardly inclined bottom 61 hinged at its highest edge and yieldingly held in a closed position against a stop 62 at its opposite edge, by a coil spring 63 on its pivot shaft 64. A radial finger 65 on said shaft is in the path of a trip dog 66 on the link 57 on the return travel of the carriage 14, and is engaged by said trip dog just before the carriage completes its return movement, so as to discharge the filler tobacco from the spout to the funnel 16 below for delivery by the latter to the roller apron 15 in time for the next advance movement of the carriage.

The to and fro movements of the carriage effect the rocking of the two filler hopper ratchet levers. This is accomplished by engaging the ratchet-lever-moving link 28 at one end with a slot 67 in a horizontal bar 68 fixedly secured to the carriage, and the other ratchet-moving link 57 with the slot of a similar bar fixed to the carriage. In each slot are two blocks 69 that respectively engage the appropriate link, when the carriage moves in one direction or the other and thereby the rocking motion of the ratchet lever is produced. Said blocks are adjustable so as to enable the stroke of the ratchet bar to be properly timed and its degree of movement varied, and thus the amount of tobacco for a cigar to be controlled, or regulated.

During the forward travel of the carriage, which results in rolling the tobacco and placing the roll on the wrapper on the vacuum plate, the nozzle 12 is moved to the die to pick up a wrapper for the next cigar, and such forward travel produces the feed of filler from the long and short filler hoppers and the dropping thereof to the pivoted bottom 61. On the reverse travel of the carriage, the nozzle is moved from the die with a wrapper, to the vacuum plate, and just before the rear limit of travel of the carriage is reached, the bottom 61 is swung down and the filler thereon is discharged to the funnel 16 and thence to the roller apron.

Figure 2:
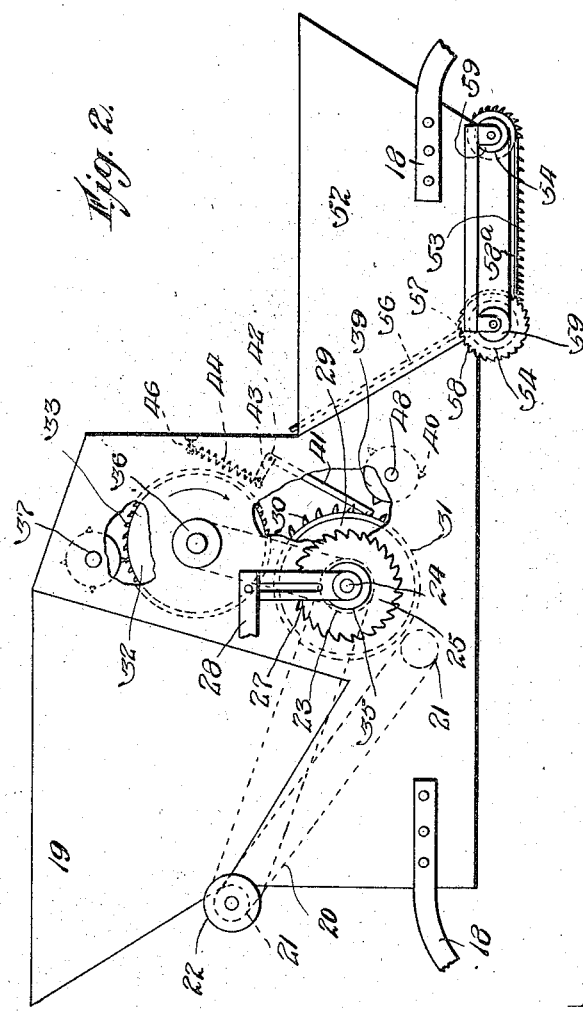
Fig. 2 is a side elevation of the filler feed mechanism detached;
Fig. 2ª is a detail view of the short filler feed discharge end.

The internal construction of the long and short filler feeds shown in Figs. 1 and 2, is similar to what is shown in my pending application No. 299,493. The short filler feed however, as shown in Fig. 3, may have a construction essentially the same as the long filler feed, in that it has a spring-held comb plate 410 that coacts with the teeth of the apron 530, a drum 290 with teeth 300, that corresponds to the drum 29 of the long filler, a brush roll 370 that corresponds to the long filler feed brush roll 37; and a picker roll 390 that strips or picks tobacco from the teeth of the apron 530. The drum 290 is on a shaft 291, mounted in adjustable bearings to change the space between the drum and the apron.

By my invention, the cigar machine is greatly simplified, since I eliminate several hundred parts that are necessary, when the belt and its essential, associated parts are employed, and the efficiency of the machine is greatly promoted. The cigar machine may be provided with my invention merely by removing said belt and said associated parts, and drilling the holes in frame and carriage necessary to bolt or secure the hopper supporting straps or arms thereto, and applying the pulley for driving the picker roll.

While I consider the machine shown in the drawings an excellent embodiment of my invention, and in some of the appended claims more or less specifically claim it, yet my invention may be embodied in machines differently constructed and so constructed, perhaps, as not to obtain to the same extent the advantages of the construction shown, and the meaning and scope of the appended claims is to be determined in the light of this statement.

I claim:

1. Filler feed mechanism arranged for cooperation with a small-cigar machine in which a rolling apron is operated by a reciprocating carriage, said mechanism comprising a long-filler hopper, a short-filler hopper, a delivery mechanism for each hopper, operative connections from said carriage to said delivery mechanisms, and means for placing a measured supply of long and short filler delivered by said delivery mechanisms directly upon said rolling apron once in each operative cycle of the machine.

2. Filler feed mechanism arranged for cooperation with a small-cigar machine in which a rolling apron is connected to and operated by a reciprocating carriage, said mechanism comprising a long-filler hopper, a short-filler hopper, a delivery mechanism for each hopper, ratchet drive means for the delivery mechanisms, operative connections from said carriage to said ratchet-drive means, and means for directing a measured supply of long and short filler delivered by said delivery mechanisms to said rolling apron once in each operative cycle of the machine.

3. Filler feed mechanism arranged for cooperation with a small-cigar machine in which a rolling apron is operated by a reciprocating carriage, said mechanism comprising a long filler hopper and a short filler hopper arranged substantially above said apron, delivery mechanism for each hopper operatively connected with said carriage, means for collecting filler materials delivered from the hoppers, and means for discharging and directing the combined filler materials to the feed apron prior to its rolling action.

4. Filler feed mechanism arranged for cooperation with a small cigar machine in which a rolling apron is connected to and operated by a reciprocating carriage, said mechanism comprising a long filler hopper and a short filler hopper arranged substantially above said apron, delivery mechanism for each hopper operatively connected with said carriage, means for collecting and temporarily retaining filler materials delivered from the hoppers, and means for discharging and directing the combined filler materials to the feed apron prior to its rolling action.

5. Filler feed mechanism arranged for cooperation with a small cigar machine in which a rolling apron is operated by a reciprocating carriage, said mechanism comprising a long filler hopper and a short filler hopper arranged substantially above said apron, delivery mechanism for each hopper operatively connected with said carriage, a spout arranged to receive the long and short filler delivered for one charge by said delivery mechanisms, a chute positioned below the spout when the carriage is retracted to direct the filler materials to the rolling apron, and means acting near the end of the retracting movement of the carriage to deliver the filler materials from the spout to the chute.

6. A small cigar machine comprising a rolling apron, a reciprocating carriage connected to the apron, hoppers for two different filler materials, discharge means for the hoppers, a funnel arranged to receive the materials discharged from the two hoppers, a movable member in the funnel to retain the materials, means actuated in the return movement of the carriage to move said member and discharge the materials, and means to direct the materials to the rolling apron.

7. A small cigar machine comprising a rolling apron, a reciprocating carriage connected to the apron, hoppers for two different filler materials, discharge means for the hoppers having operative connections with said carriage, a funnel arranged to receive the materials discharged from the two hoppers, a movable member in the funnel to retain the materials, means actuated in the return movement of the carriage to move said member and discharge the materials, and means carried by the carriage to direct the materials to the rolling apron.

In testimony whereof I affix my signature.

FRANK MORGAN WHITE.